(12) United States Patent
Jordan (10) Patent No.: US 11,235,827 B2
(45) Date of Patent: Feb. 1, 2022

(54) HEIGHT-ADJUSTABLE SEAT POST (71) Applicant: Wolf Tooth Components, LLC, Savage, MN (US)

(72) Inventor: Jeffrey Scott Jordan, Fishers, IN (US)

(73) Assignee: Wolf Tooth Components, LLC, Burnsville, MN (US)

( * ) Notice: Subject to any disclaimer, the term of this patent is extended or adjusted under 35 U.S.C. 154(b) by 180 days.

(21) Appl. No.: 16/373,457

(22) Filed: Apr. 2, 2019

(65) Prior Publication Data

US 2019/0300088 A1   Oct. 3, 2019

Related U.S. Application Data (60) Provisional application No. 62/651,379, filed on Apr. 2, 2018.

(51) Int. Cl.
| *B62J 1/08* | (2006.01) |
| *B62K 19/36* | (2006.01) |
| *F15B 15/16* | (2006.01) |
| *F15B 21/044* | (2019.01) |
| *F16B 2/06* | (2006.01) |
| *F15B 11/072* | (2006.01) |

(52) U.S. Cl.
CPC ............... *B62J 1/08* (2013.01); *B62K 19/36* (2013.01); *F15B 15/16* (2013.01); *F15B 21/044* (2013.01); *F16B 2/065* (2013.01); *B62J 2001/085* (2013.01); *F15B 11/072* (2013.01)

(58) Field of Classification Search
CPC ............................. B62J 1/08; B62J 2001/085
See application file for complete search history.

(56) References Cited

U.S. PATENT DOCUMENTS

| 3,496,838 | A | | 2/1970 | Barrett et al. | |
| 5,657,958 | A | * | 8/1997 | McLaughlin | B62J 1/02 188/132 |
| 6,182,939 | B1 | * | 2/2001 | Schoepper | B62J 1/06 248/599 |
| 7,673,936 | B2 | | 3/2010 | Hsu | |
| 8,016,349 | B2 | | 9/2011 | Mouri et al. | |
| 8,177,251 | B2 | | 5/2012 | Shirai | |
| 8,191,964 | B2 | | 6/2012 | Hsu | |
| 8,302,983 | B1 | | 11/2012 | Hsu | |
| 8,308,124 | B2 | | 11/2012 | Hsu | |

(Continued)

FOREIGN PATENT DOCUMENTS

| CN | 105564545 | 5/2016 |
| EP | 1799535 | 10/2013 |

(Continued)

*Primary Examiner* — Tony H Winner
(74) *Attorney, Agent, or Firm* — Dicke, Billig & Czaja, PLLC (57) ABSTRACT

A height-adjustable seat post includes a lower tube having a top open end and a bottom open end, an upper tube having a top end and a bottom end, and a saddle clamp removably coupled to the upper tube. The top end of the upper tube is configured to be received through the bottom open end of the lower tube and extend beyond the top open end, and, when the saddle clamp is removed from the upper tube, the top end of the upper tube is configured to pass through the bottom open end of the lower tube.

31 Claims, 10 Drawing Sheets (56) References Cited

U.S. PATENT DOCUMENTS

| | | | |
|---|---|---|---|
| 8,540,268 B1* | 9/2013 | Soucek | B62K 19/36 |
| | | | 280/281.1 |
| 8,596,663 B2 | 12/2013 | Shirai | |
| 8,950,771 B2 | 2/2015 | Felsi et al. | |
| 9,027,434 B2 | 5/2015 | Neeley | |
| 9,126,647 B2 | 9/2015 | Kuo | |
| 9,157,523 B2 | 10/2015 | Miki et al. | |
| 9,242,688 B2 | 1/2016 | McAndrews et al. | |
| 9,580,124 B2 | 2/2017 | Shirai | |
| 9,969,448 B1* | 5/2018 | Chen | B62J 1/08 |
| 2002/0149241 A1 | 10/2002 | Morgan, Jr. | |
| 2006/0066074 A1 | 3/2006 | Turner | |
| 2011/0257848 A1 | 10/2011 | Shirai | |
| 2012/0104221 A1 | 5/2012 | Hsu | |
| 2012/0243931 A1 | 9/2012 | Hsu | |
| 2013/0093231 A1 | 4/2013 | Hsu | |
| 2013/0221713 A1 | 8/2013 | Pelot et al. | |
| 2014/0013875 A1 | 1/2014 | Neeley | |
| 2014/0239682 A1* | 8/2014 | Tisue | B62J 1/08 |
| | | | 297/215.14 |
| 2015/0034779 A1 | 2/2015 | McAndrews et al. | |
| 2015/0232142 A1 | 8/2015 | Shirai | |
| 2017/0080990 A1* | 3/2017 | Tsai | A47C 3/32 |
| 2017/0106928 A1 | 4/2017 | Madau et al. | |
| 2017/0225731 A1* | 8/2017 | Hsu | B62J 1/08 |
| 2018/0194418 A1* | 7/2018 | Bowers | F16B 7/1409 |

FOREIGN PATENT DOCUMENTS

| | | |
|---|---|---|
| WO | WO2016029301 | 3/2016 |
| WO | WO2016113673 | 7/2016 |

\* cited by examiner

Fig. 6B 160mm TRAVEL FIXED HEAD

Fig. 6A 125mm TRAVEL FIXED HEAD

HEIGHT-ADJUSTABLE SEAT POST

CROSS-REFERENCE TO RELATED APPLICATIONS

This application claims priority under 35 U.S.C. § 119(e) to U.S. Provisional Patent Application Ser. No. 62/651,379 filed on Apr. 2, 2018, and incorporated herein by reference.

TECHNICAL FIELD

This instant specification relates to height-adjustable seat posts, commonly called "dropper seatposts" or "dropper posts".

BACKGROUND

Modern dropper posts can be heavy and may require frequent service. This may contribute to why dropper posts have not been broadly adopted by all cycling sectors (cross-country mountain biking, cyclecross, road, recreational, etc.).

SUMMARY

In general, this document describes height-adjustable ("dropper") seat posts. Namely, a dropper seatpost that is lightweight yet reliable, reducing intervals between service. When the dropper seatpost needs service, service should be user friendly.

The systems and techniques described here may provide one or more of the following advantages:
1. Headless stanchion and one-piece lower
    a. Decreases weight
    b. Allows another two degrees of adjustability (for a total of four degrees of adjustability, including height, rotation, tilt, and offset, as disclosed in U.S. Provisional Patent Application Ser. No. 62/651,379, to which this application claims priority under 35 U.S.C. § 119(e))
    c. Simpler to fabricate
    d. User serviceable
2. Trimmable Stanchion
    a. Ultralight architecture
3. Full insertion lower tube w/ integrated clamp and frame integration
    a. Hyperlight architecture The details of one or more implementations are set forth in the accompanying drawings and the description below. Other features and advantages will be apparent from the description and drawings.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure.

Dropper Post Description

Figure 1:
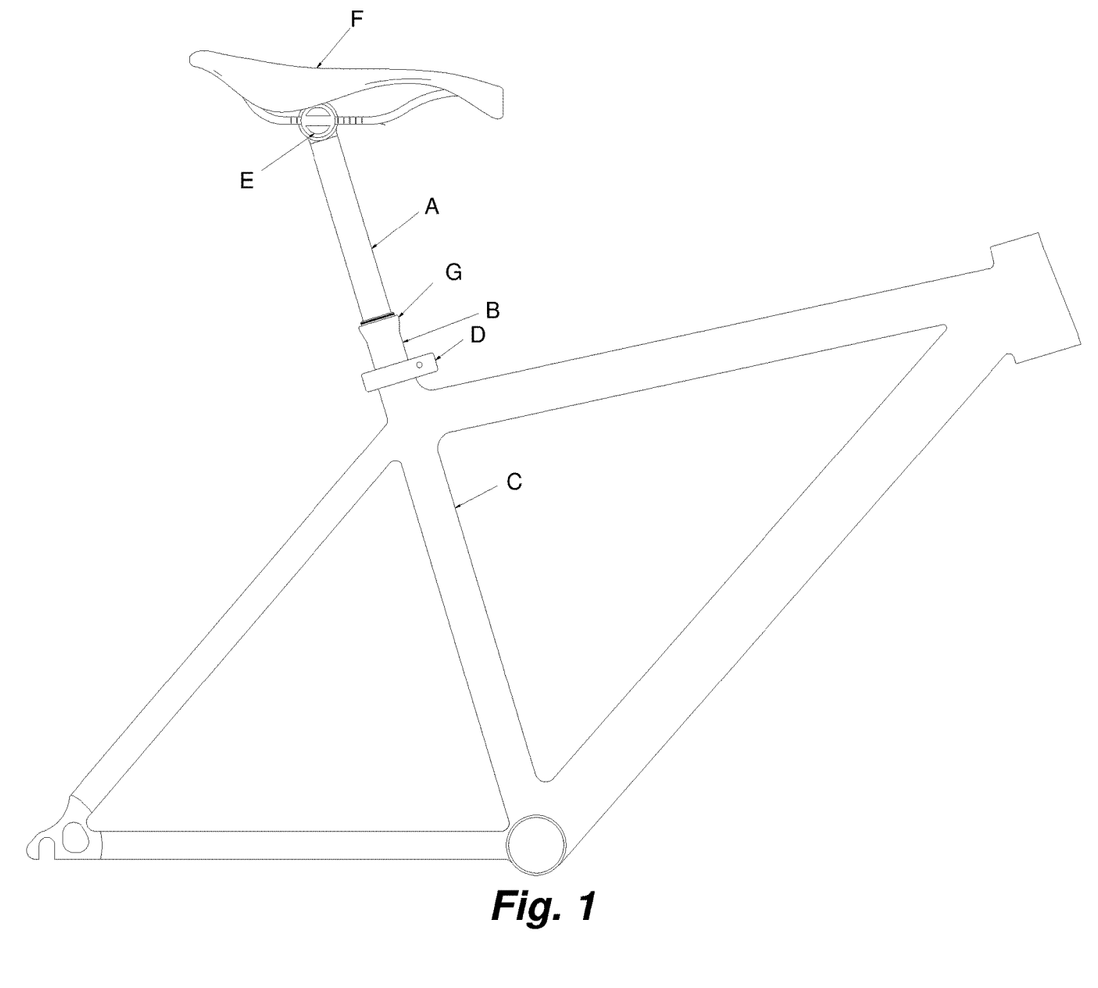
FIG. 1 illustrates an example of a traditional dropper seatpost with fixed head height.

With reference, for example, to FIG. 1, a traditional dropper post includes an upper tube A and a lower tube B. The upper tube A (commonly referred to as "stanchion tube") diameter is smaller than the lower tube B diameter and small enough to telescopically slide within the lower tube B. The lower tube B is typically fastened in the frame seat tube C of a bicycle with a post clamp D. The lower tube B does not move with respect to the bicycle frame. The upper tube A axially and telescopically moves with respect to the lower tube B. The overall height of the dropper post is traditionally adjusted by the post clamp D—loosening the post clamp D to slide the dropper post in/out within the frame seat tube C—setting the lower tube B partially extended outside the frame depending on the height needed. Once the proper height has been achieved, the post clamp D is tightened. The lower tube B is then secured to the frame seat tube C and is unable to slide or rotate due to friction between the frame and lower tube B at the post clamp D.

At the top of the upper tube A is a saddle clamp E. The saddle clamp E attaches the bicycle saddle F to the upper tube A. When the upper tube A slides within the lower tube B, the saddle F slides with it, adjusting the saddle F height with respect to the bicycle frame. Sliding in this matter is the fundamental role of a dropper post. Traditionally, the saddle clamp E is in fixed position with respect to the upper tube A and only allows for offset and tilt adjustments of the saddle F. This is called a "fixed head" saddle clamp E. In FIG. 1, note that the post collar G is extended away from the frame.

Figures 2A, 2B:
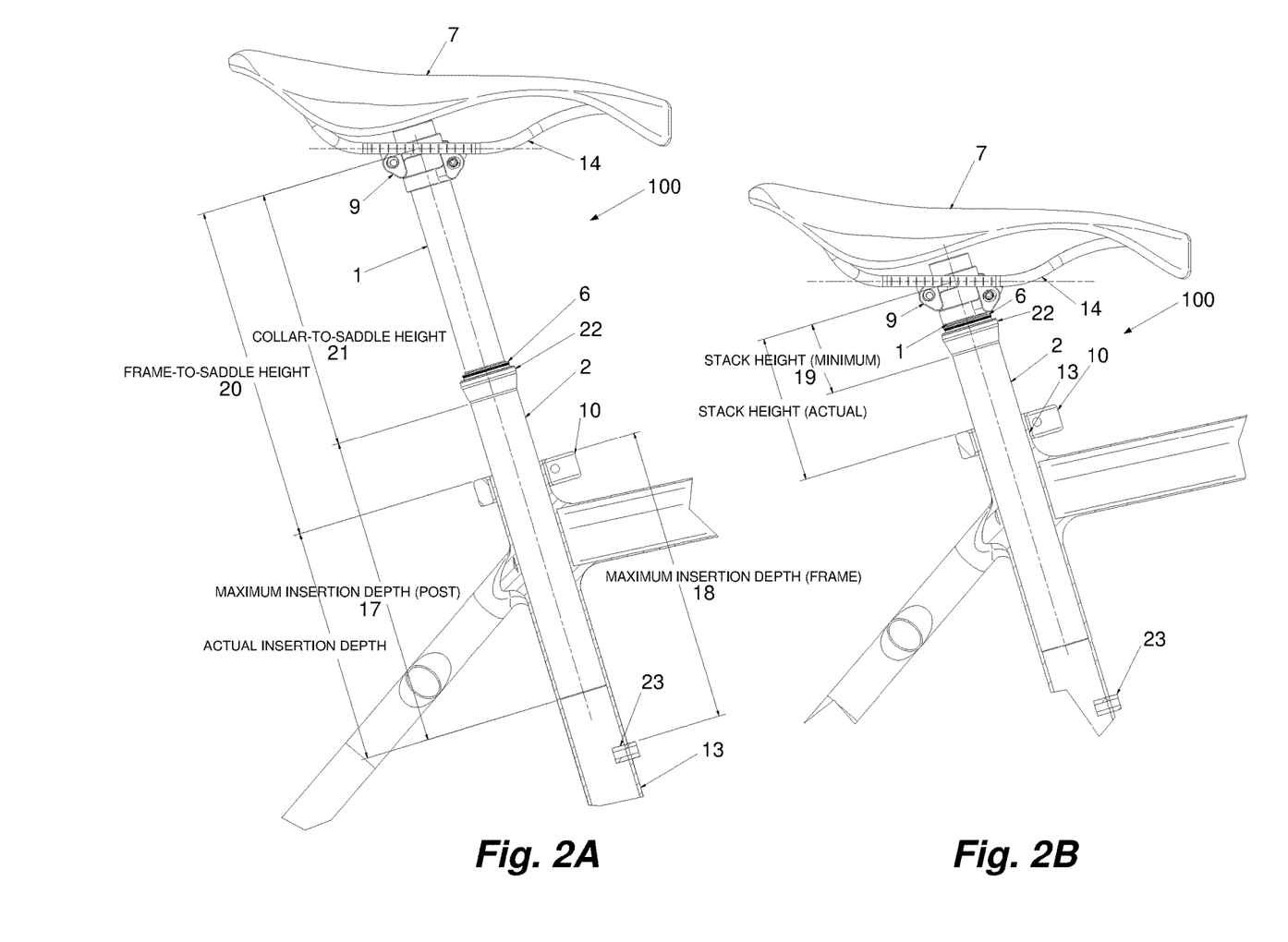
FIGS. 2A and 2B are examples of height illustrations of a dropper seatpost in accordance with the present disclosure.

With reference, for example, to FIGS. 2A, 2B, the dropper post 100 includes an upper tube 1 and a lower tube 2. The upper tube 1 (commonly referred to as "stanchion tube") diameter is smaller than the lower tube 2 diameter and small enough to telescopically slide within the lower tube 2. The lower tube 2 is typically fastened in the frame seat tube 13 of a bicycle with a post clamp 10. When fastened in the frame seat tube 13, the lower tube 2 does not move with respect to the bicycle frame. The upper tube 1 axially and telescopically moves with respect to the lower tube 2. The overall height of the dropper post is traditionally adjusted by the post clamp 10—loosening the post clamp 10 to slide the dropper post in/out within the frame seat tube 13—setting the lower tube 2 partially extended outside the frame depending on the height needed. Once the proper height has been achieved, the post clamp 10 is tightened. The lower tube 2 is then secured to the frame seat tube 13 and is unable to slide or rotate due to friction between the frame and lower tube 2 at the post clamp 10.

At the top of the upper tube 1 is a saddle clamp 9. The saddle clamp 9 attaches the bicycle saddle 7 to the upper tube 1. When the upper tube 1 slides within the lower tube 2, the saddle 7 slides with it, adjusting the saddle 7 height with respect to the bicycle frame. Sliding in this matter is the fundamental role of a dropper post. In examples, the saddle clamp 9 is adjustable with respect to the upper tube 1 and allows for height, rotation, tilt, and offset adjustments of the saddle 7. The saddle clamp 9 is a "floating head height" or "floating height" saddle clamp 9, an example of which is disclosed in U.S. Provisional Patent Application Ser. No. 62/651,379, to which this application claims priority under 35 U.S.C. § 119(e).

Figure 3A:
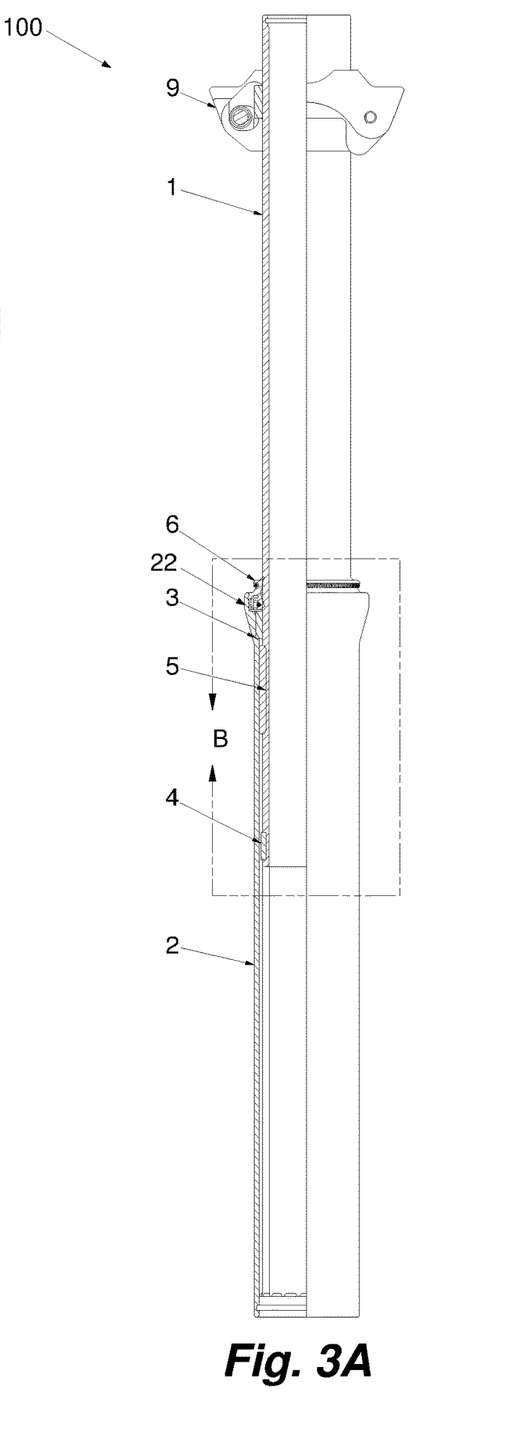
FIG. 3A is an example of a section of telescopic overlap and bushing support of upper and lower tubes of a dropper seatpost in accordance with the present disclosure.
Figure 3B:
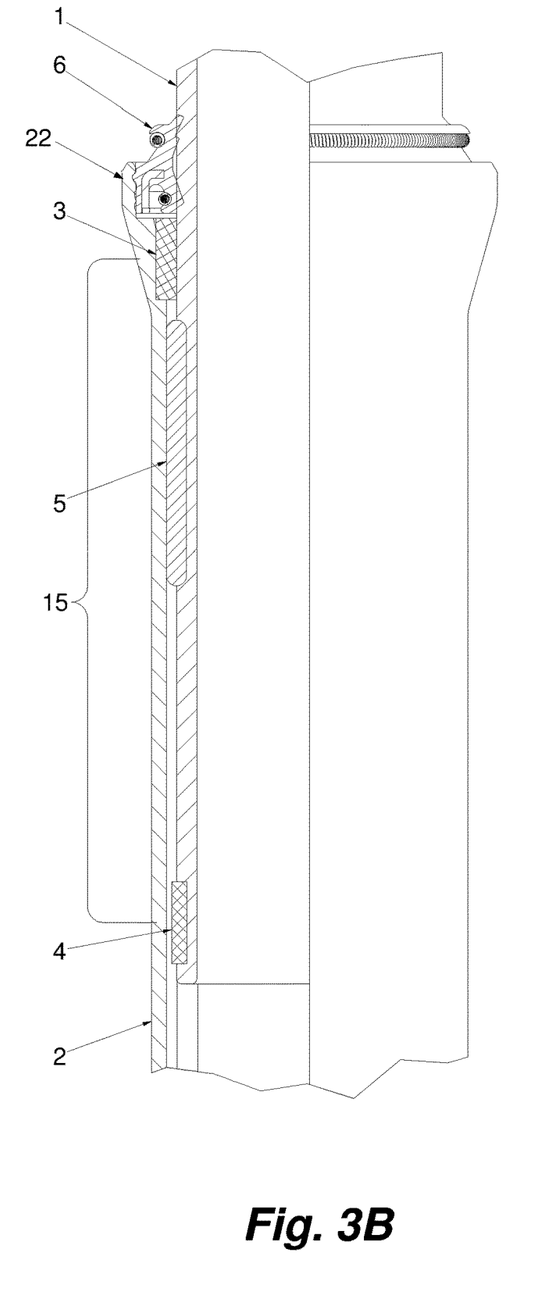
FIG. 3B is an enlarged view of section B of FIG. 3A.

With reference, for example, to FIGS. 3A, 3B, there is a telescopic overlap between the upper tube 1 and the lower tube 2. This allows a bending moment to be transferred from the upper tube 1 to the lower tube 2, in the case of weight being applied off axis to the saddle 7. At the bottom of the upper tube 1 is a lower bushing 4. At the top of the lower tube 2 is an upper bushing 3. The lower bushing 4 sits in a groove in the upper tube 1. As the upper tube 1 slides in the lower tube 2, the lower bushing 4 slides with it. In examples, the upper bushing 3 is pressed into a counterbore at the top of the upper tube 1 and is fixed in position—usually in a larger OD (outer diameter) post collar 22. The deeper the upper tube 1 slides within the lower tube 2, the greater the spacing between the upper bushing 3 and lower bushing 4. When the dropper seat post 100 is fully extended, the bushings 3 and 4 are spaced far enough apart to survive resulting forces from bending moments applied to the dropper post 100. The further the bushings 3 and 4 are apart from each other, the lower the resulting forces from bending moments.

Figure 4:
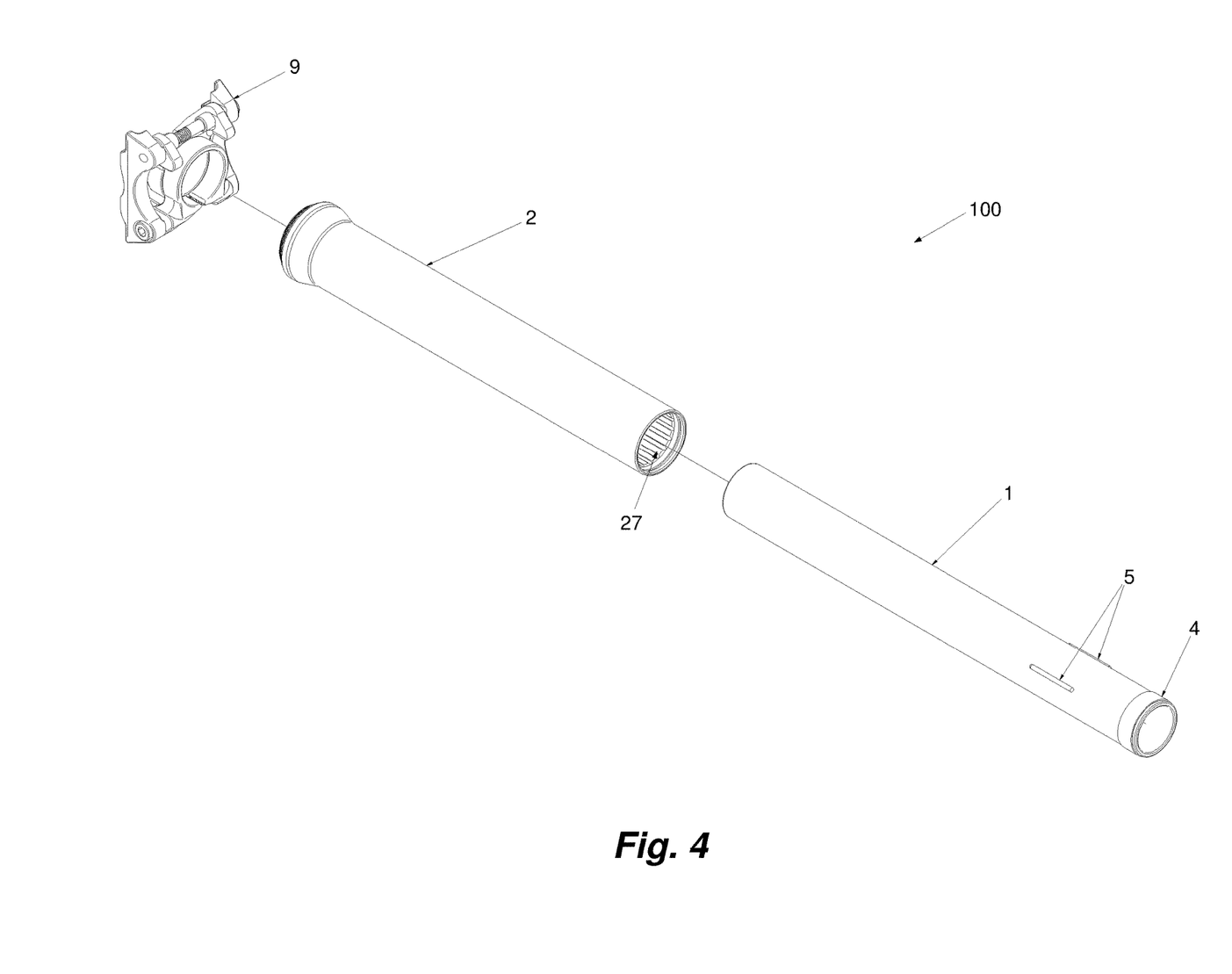
FIG. 4 illustrates an example of disassembly of a shell of a dropper seatpost by removing a saddle clamp from an upper tube, then sliding the upper tube (and lower bushing plus anti-rotation pins) out a bottom of a lower tube in accordance with the present disclosure.

With reference, for example, to FIGS. 3A, 3B, 4, in examples, installed into an array of axially parallel slot shaped pockets on the upper tube 1 are anti-rotation pins 5. The pockets prevent the anti-rotation pins 5 from moving with respect to the upper tube 1. When the upper tube 1 is installed in the lower tube 2, these anti-rotation pins 5 slide in an array of axially parallel grooves 27 in the lower tube 2. The parallel grooves 27 form a spline-like internal feature to the lower tube 2. The anti-rotation pins 5 prevent the upper tube 1 from axially rotating with respect to the lower tube 2. Therefore, since the saddle 7 is attached to the upper tube 1 and the upper tube 1 is not able to rotate with respect to the lower tube 2, and the lower tube 2 cannot rotate with respect to the bicycle frame, then the saddle 7 cannot rotate with respect to the bicycle frame.

With reference, for example, to FIGS. 2A, 2B, besides travel options, dropper posts come in varying overall lengths to accommodate different frame-to-saddle heights 20 as dictated by variety in human anatomy. Traditionally, for the same frame-to-saddle height 20, a dropper post with short travel will have a lower tube 2 that sticks further out of the frame when compared to one with longer travel. The further the lower tube 2 sticks out of the frame, the greater the bending moment when the lower tube 2 is exposed to a load. Therefore, the lower tube 2 may have a thick wall to take such a load.

Traditionally, the lower tube 2 is clamped by the post clamp 10 in the frame seat tube 13 within certain limits. The dropper post should not be installed any shallower than the minimum insertion depth. In the opposite extreme, since the post collar 22 of the lower tube 2 is a larger diameter than the frame tube, the lower tube 2 can only be inserted up to the post collar 22. This is called the maximum insertion depth 17 of the post. The minimum insertion depth is determined by the minimum length of lower tube 2 that should be supported in the frame seat tube 13 in order to support the maximum bending moments applied to the dropper post (pure axial loads require less insertion depth and therefore the bending moments are the leading factor to the minimum insertion depth).

Maximizing the room inside the dropper post allows for the locking mechanism (or cartridge assembly) of the dropper post (typically a pneumo-hydraulic or mechanical system). However, some of this room is taken up by the thickness of the telescopic tubing. The thicker the lower tube 2, the smaller the ID (inner diameter) of the lower tube 2. Therefore, the upper tube 1 may also be smaller. For the upper tube 1 to also withstand bending moments, it may also have a thick wall. Therefore, the thicker the upper tube 1, the smaller the ID of the upper tube 1. Traditionally, there has not been much room remaining for the locking mechanism, restricting the architecture and layout of components to what we have as modern seatposts—heavy, unreliable, and difficult to service.

Most dropper post users seek to achieve as much dropper travel as possible for their frame-to-saddle height 20. Traditionally, when choosing a dropper post for their bike, the user attempts to find one with a collar-to-saddle height 21 that does not exceed their frame-to-saddle height 20.

Users also consider the maximum insertion depth 17. Some bicycle frame designs have depth limiting frame features 23 in the way (tube bends, suspension pivot points, welds, etc.) that will not allow the dropper post to be inserted all the way to the maximum insertion depth 17. Therefore, the difference between the maximum insertion depth 17 and the available depth in the frame (maximum insertion depth of the frame 18), is added to the collar-to-saddle height 21. If the adjusted collar-to-saddle height 21 exceeds the frame-to-saddle height 20, the dropper post may be too long for the user. This information may not be readily available to the user, often leading to confusion and mis-purchased dropper posts. Sometimes this information may not be publically available to the consumer for the consumer to make an educated purchase.

Stack height 19 is another dimension that users evaluate when deciding which dropper post to install on their bike. Stack height 19, as a minimum stack height, is the collar-to-saddle height 21 when the dropper post is fully compressed (technically, the collar-to-saddle rail height). A lower stack height 19 enables the saddle 7 to be as low as possible when the dropper seatpost is fully compressed.

Serviceability: Assembly/Disassembly

With the traditional dropper post, in order to remove the upper tube A from the lower tube B, the upper tube A is slid out through the top of the lower tube B. This is because the saddle clamp E is permanently mounted to the top of the upper tube A and will not fit through the ID of the lower tube B. However, with the upper tube A and the lower tube B including bushings, similar to lower bushing 4 and upper bushing 3, respectively, and the upper tube A including anti-rotation pins, similar to anti-rotation pins 5, in attempting to remove the upper tube A through the top of the lower tube B, the bushings will collide with each other, stopping removal. In addition, the anti-rotation pins will collide against the upper bushing. If the anti-rotation pins can be removed, but not the lower bushing, the lower bushing will collide with the upper bushing, preventing the upper tube A from being removed.

Removal of the upper tube A through the top of the lower tube B can be accommodated by a couple of methods: 1) The lower tube B and post collar G can be a multi-piece design in which the post collar G can be removed and the upper bushing can be extracted, allowing room for the lower bushing and anti-rotation pins to slide out of the lower tube B. 2) The lower bushing and anti-rotation pins can be removed from the upper tube A first, before the upper tube A is pulled through the top of the lower tube B. This can be accommodated by a removable cap on the bottom of the upper tube A. When the cap is installed, the lower bushing and anti-rotation pins are secure, when the cap is removed, the bushing and anti-rotation pins are free to be stripped off the end of the upper tube A.

Multi-piece lower tube B and upper tube A designs may add manufacturing complexity, more parts, and weight. But the biggest drawback to these configurations is that they limit the internal configuration of the locking mechanism (in the case of a removable cap on the upper tube A) or increase the stack height 19 (in the case of a two-piece post collar G).

With reference, for example, to FIG. 4, with the dropper post 100, the upper tube 1 can be extracted through the bottom of the lower tube 2, without having to remove the bushings and anti-rotation pins 5. The upper tube 1 and the lower tube 2, therefore, can each be one-piece designs. To achieve this, the saddle clamp 9 is not permanently mounted to the upper tube 1. Rather, the saddle clamp 9 is removably coupled to the upper tube 1. The saddle clamp 9 is a "floating head" saddle clamp 9, an example of which is disclosed in U.S. Provisional Patent Application Ser. No. 62/651,379, to which this application claims priority under 35 U.S.C. § 119(e). The floating head saddle clamp 9 enables a lighter saddle clamp 9 to be engineered, and provides two more degrees of adjustment over a traditional saddle clamp 24—height and rotation, as disclosed in U.S. Provisional Patent Application Ser. No. 62/651,379, to which this application claims priority under 35 U.S.C. § 119(e).

Figure 5:
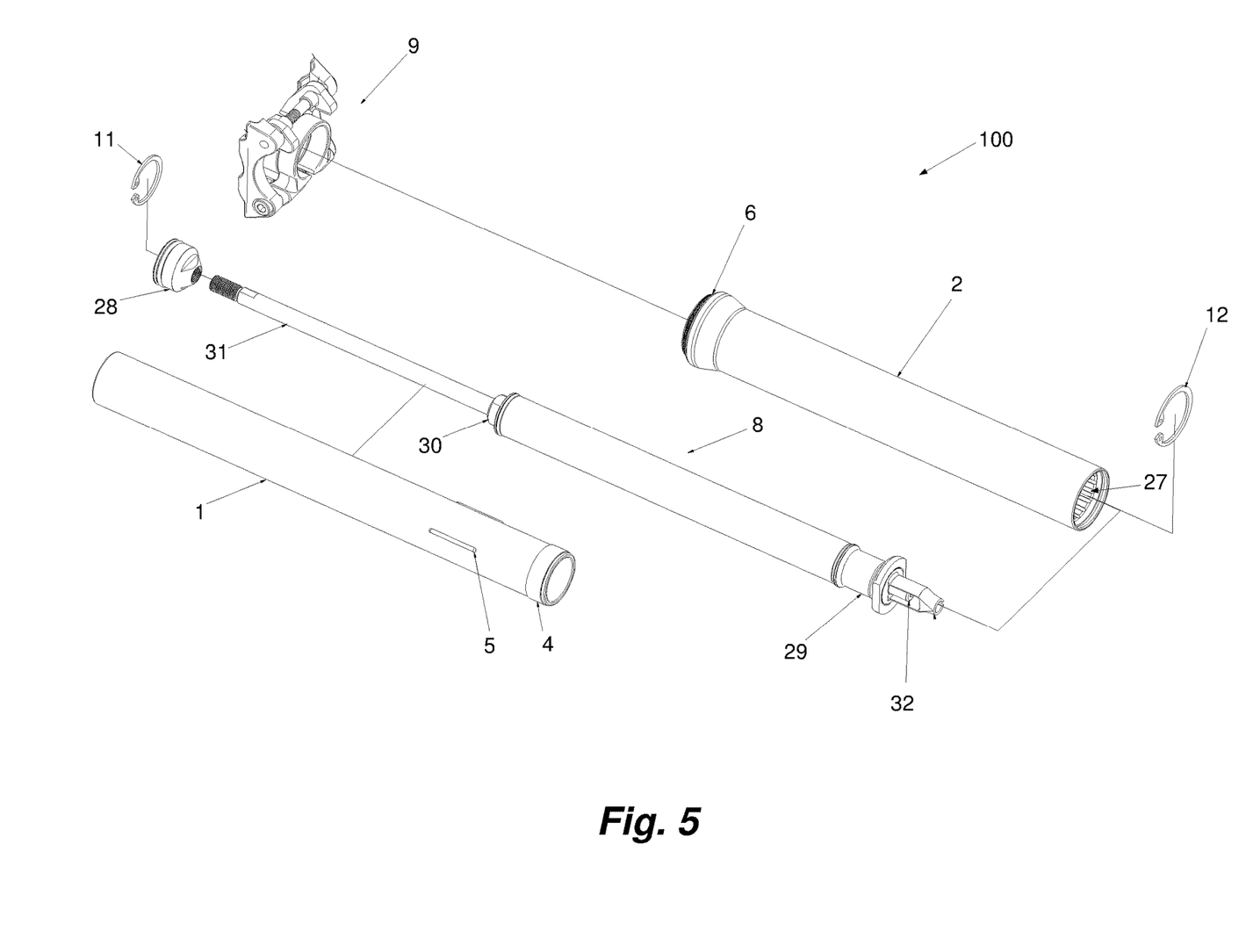
FIG. 5 illustrates an example of assembly/disassembly of a cartridge assembly within a shell of a dropper seatpost in accordance with the present disclosure.

With reference, for example, to FIG. 5, with the architecture of the dropper post 100, including the "floating head" saddle clamp 9, assembly/disassembly of a cartridge assembly within the shell of the dropper seatpost is more readily permitted, enabling serviceability of the dropper post.

Figure 6A:
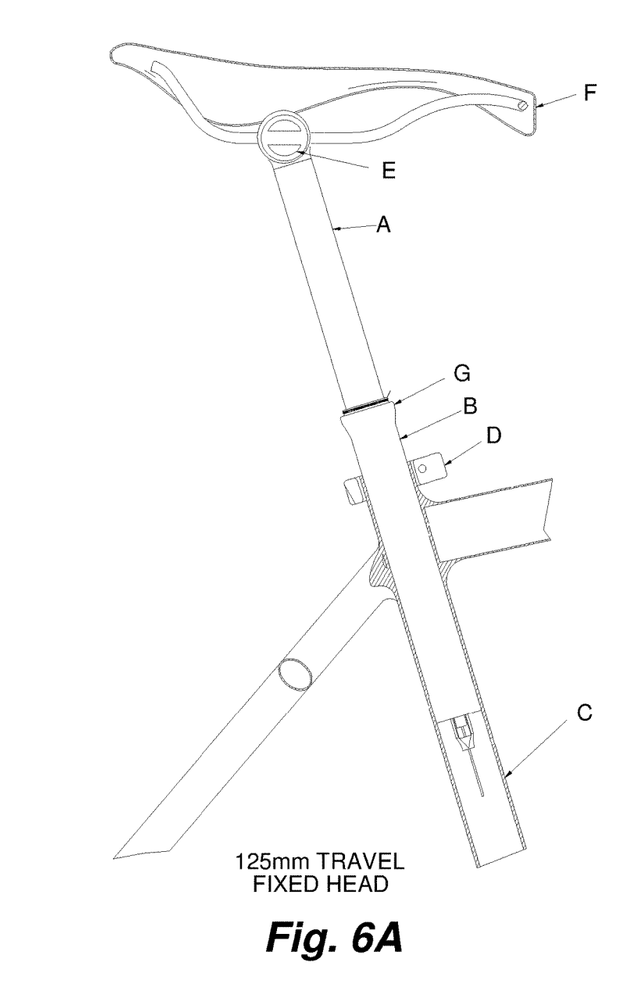
FIGS. 6A and 6B are examples of a 125 mm travel fixed head dropper seatpost and a 160 mm travel fixed head dropper seatpost, respectively.
Figure 6B:
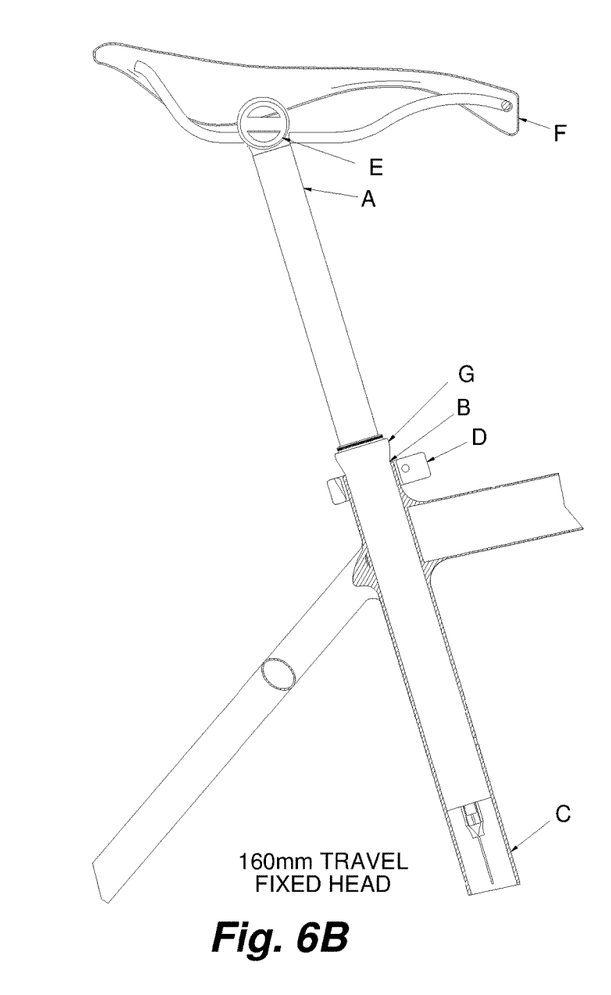

With reference, for example, to FIGS. 6A and 6B, note that for an example saddle height, with a dropper seatpost having a fixed head saddle clamp E, the 125 mm fixed head dropper seatpost meets the example saddle height but the lower tube E sticks out of the frame, whereas the 160 mm fixed head dropper seatpost is too long for the example saddle height, even when fully inserted in frame. Thus, for the example saddle height, with the 125 mm travel fixed head dropper seatpost, travel is not maximized and the lower tube E is exposed to a bending moment since it protrudes from the frame.

Figure 7A:
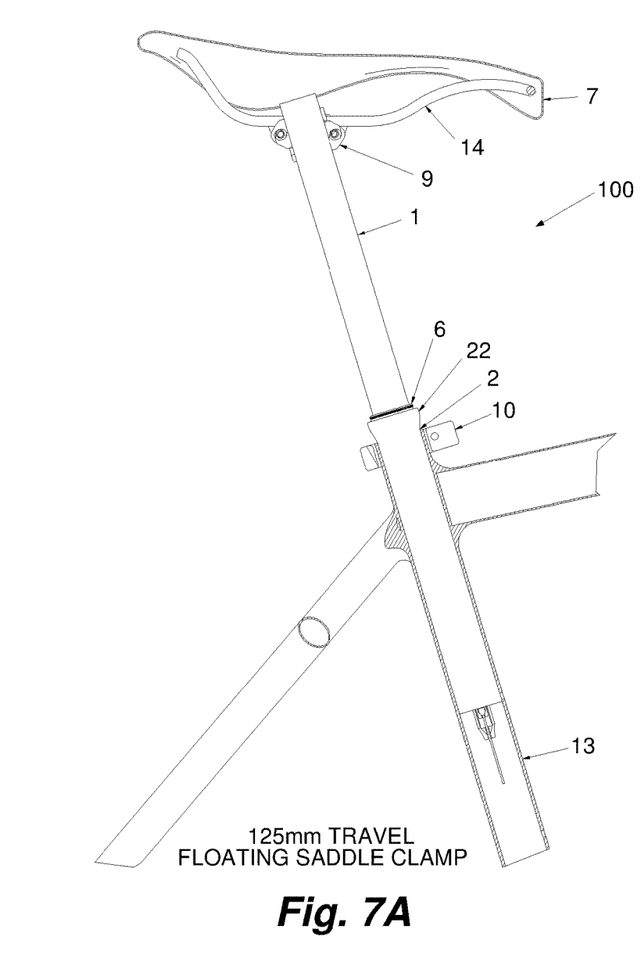
FIGS. 7A and 7B are examples of a 125 mm travel floating saddle clamp dropper seatpost and a 160 mm travel floating saddle clamp dropper seatpost, respectively, in accordance with the present disclosure.
Figure 7B:
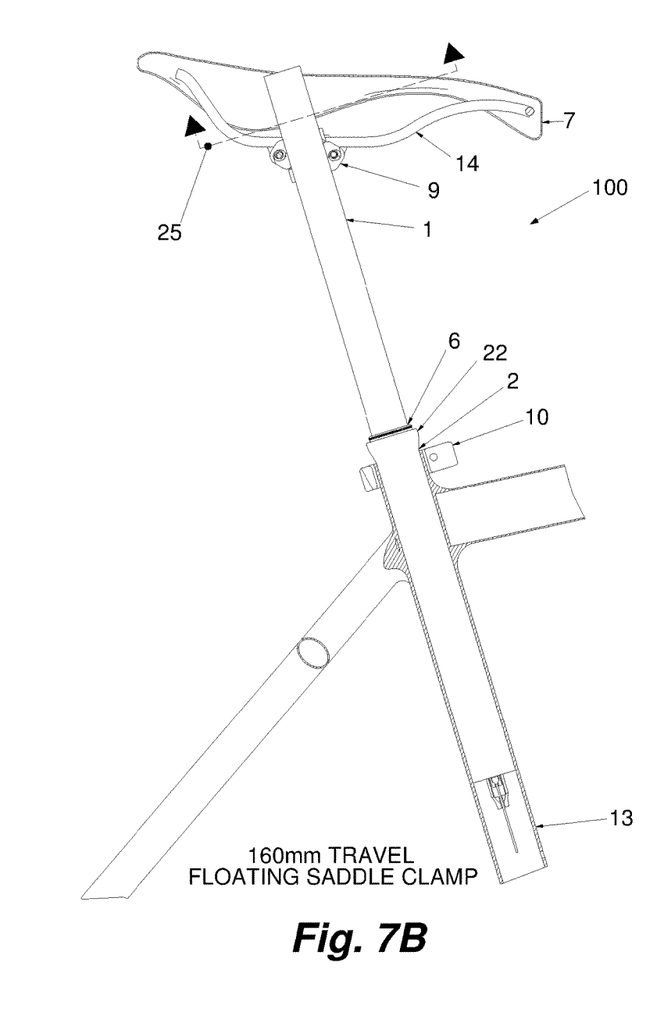

Further to the overall architecture of the dropper post 100, the "floating head" saddle clamp 9 provides the dropper post 100 with additional height adjustment. With reference, for example, to FIGS. 7A and 7B, note that for an example saddle height, with a dropper seatpost having a floating head height, the 125 mm floating saddle clamp dropper seatpost meets the example saddle height with the lower tube fully inserted in the frame, such that no trimming is needed. While the 160 mm floating saddle clamp dropper seatpost meets the example saddle height, trimming (as designated by trim line 25) permits a fully inserted lower tube. Thus, for the example saddle height, the 160 mm travel floating saddle clamp dropper seatpost provides the benefit that the user can fit more travel, with no gap in sizing. In addition, for the example saddle height, with both the 125 mm travel floating saddle clamp dropper seatpost and the 160 mm travel floating saddle clamp dropper seatpost, the lower tube is fully supported by the frame seat tube.

Often, the user wants the most travel that can be fit in their frame. If the user tries to fit a conventional post and the collar-to-saddle height 21 is too much, then they are forced to go to the next shorter travel size. This has two drawbacks: 1) the user will not get as much travel, and 2) the lower tube 2 is extended out of the frame to achieve the frame-to-saddle height 20. With the "floating head" saddle clamp 9, a second degree of height adjustment at the interface of the saddle clamp 9 to upper tube 1 is provided, such that a change in height can be made to an otherwise too long of a dropper post. This also allows a user to keep the post collar 22 of the lower tube 2 as close to the frame as possible (the dropper post is inserted into the frame as far as possible).

If the amount of adjustment available at the top of the upper tube 1 is great enough, the lower tube 2 can be fully inserted in the frame seat tube 13 and does not have to extend out of the frame. This provides an advantage in that, with the lower tube 2 fully inserted into the frame, the walls of the lower tube 2 are reinforced by the frame seat tube 13. No longer does the lower tube 2 have to be designed for a variety of extension heights and bending moments. This means that the lower tube 2 wall thickness may decrease. A decrease in lower tube 2 wall thickness means an increase in lower tube 21D. An increase in lower tube 21D means more room for the upper tube 1 to slide and a larger upper tube 10D. A larger upper tube 10D means more resistance to bending and thus a thinner wall. A thinner upper tube 1 wall means a larger upper tube 11D. A larger upper tube 11D provides more room for internal locking mechanisms.

A thinner lower tube 2 also means a lighter lower tube 2. Since the upper tube 1 may grow in length, it will need to be able to handle the increased bending moment. But because the upper tube 1 increases in diameter, typically the upper tube 1 wall thickness can decrease (the biggest effect on resistance to bending moment is the outside diameter) and still handle the bending moment. This provides even more internal room for locking mechanisms.

With the dropper post 100, manufacturing of parts and assembly/disassembly are made easier, fit range per seatpost size increases, weight decreases, and internal architecture for locking mechanisms opens.

Further Use of this Technology

With reference, for example, to FIG. 7B, an extra-long upper tube 1 can allow for it to be trimmed to size. This becomes an advantage for users looking not necessarily for maximum travel, but for lightest weight. A trimmable upper tube 1 allows the travel and locking mechanism to be, in large part, within the lower tube 2. This keeps the weight low on the bike and also provides only the travel the user desires. Envision a short travel dropper post with long upper tube 1. This would allow for a long frame-to-saddle height 20 or collar-to-saddle height 21 (now an obsolete measurement because it is the same as frame-to-saddle) while minimizing the amount of telescopic tube material required.

Figure 8:
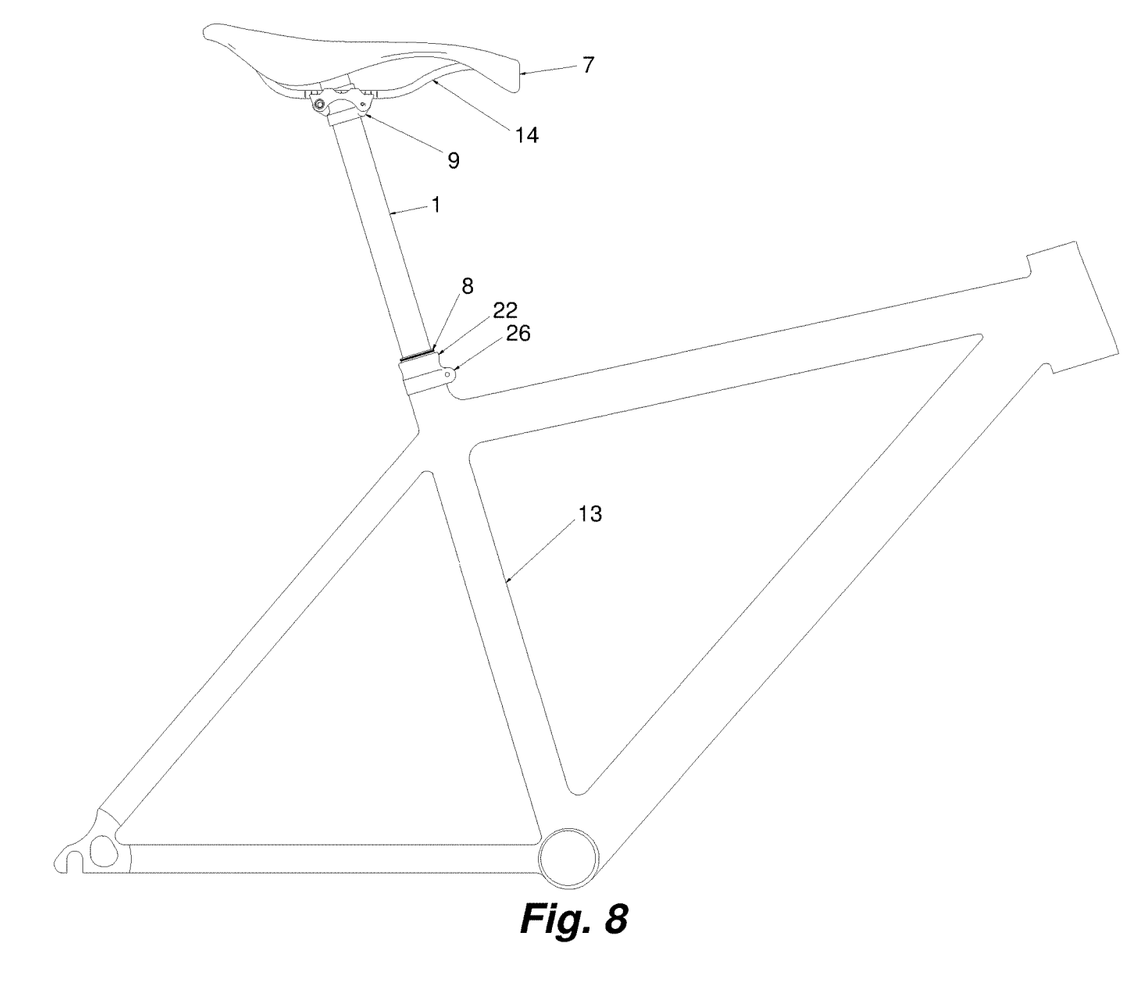
FIG. 8 illustrates an example of a post clamp integrated into a collar of a dropper seatpost in accordance with the present disclosure, with a lower tube fully inserted.
Figure 9:
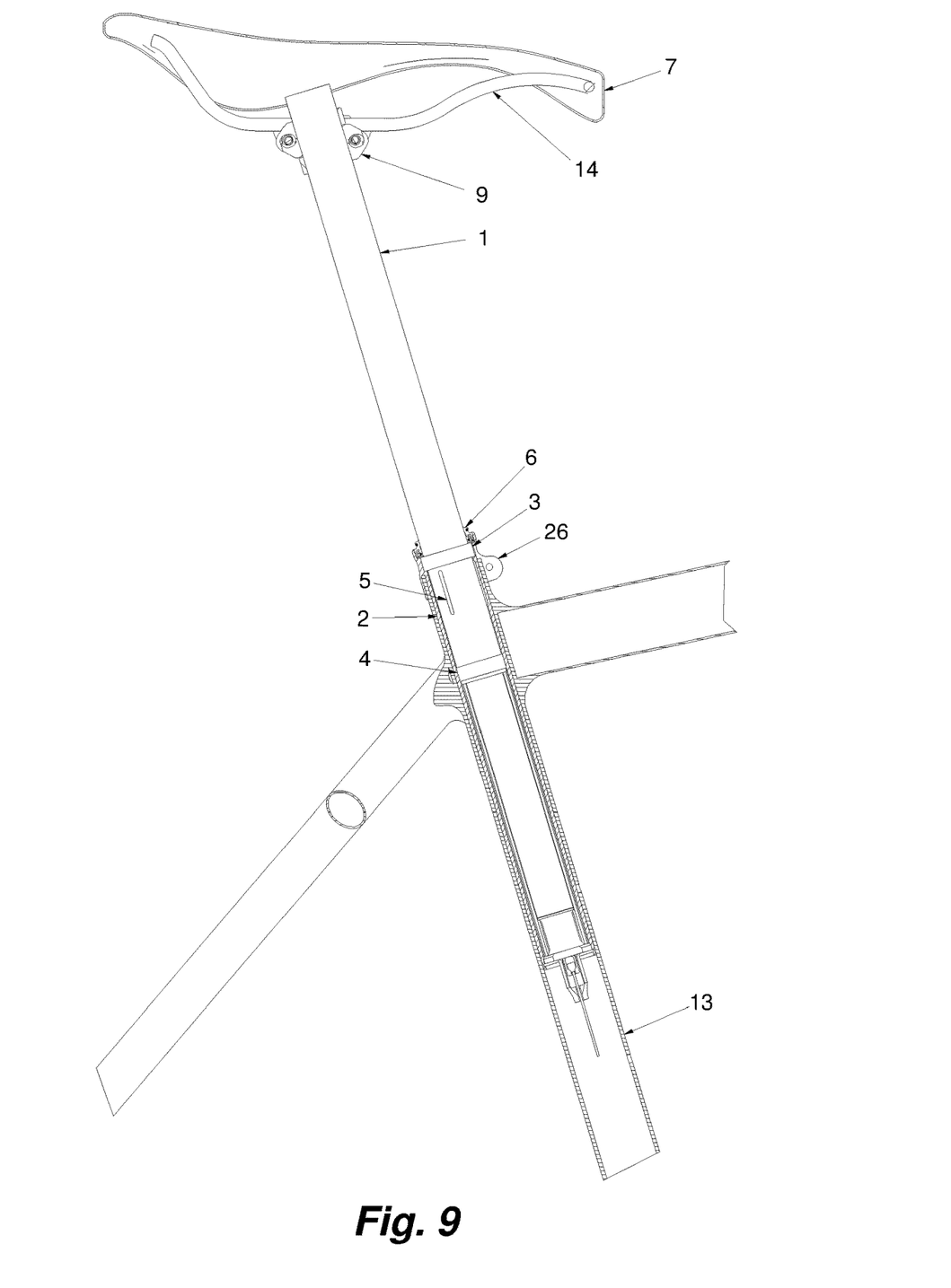
FIG. 9 is a cross-section illustrating an example of an integrated post clamp/dropper collar securing a lower tube in a frame in accordance with the present disclosure.
Figure 10:
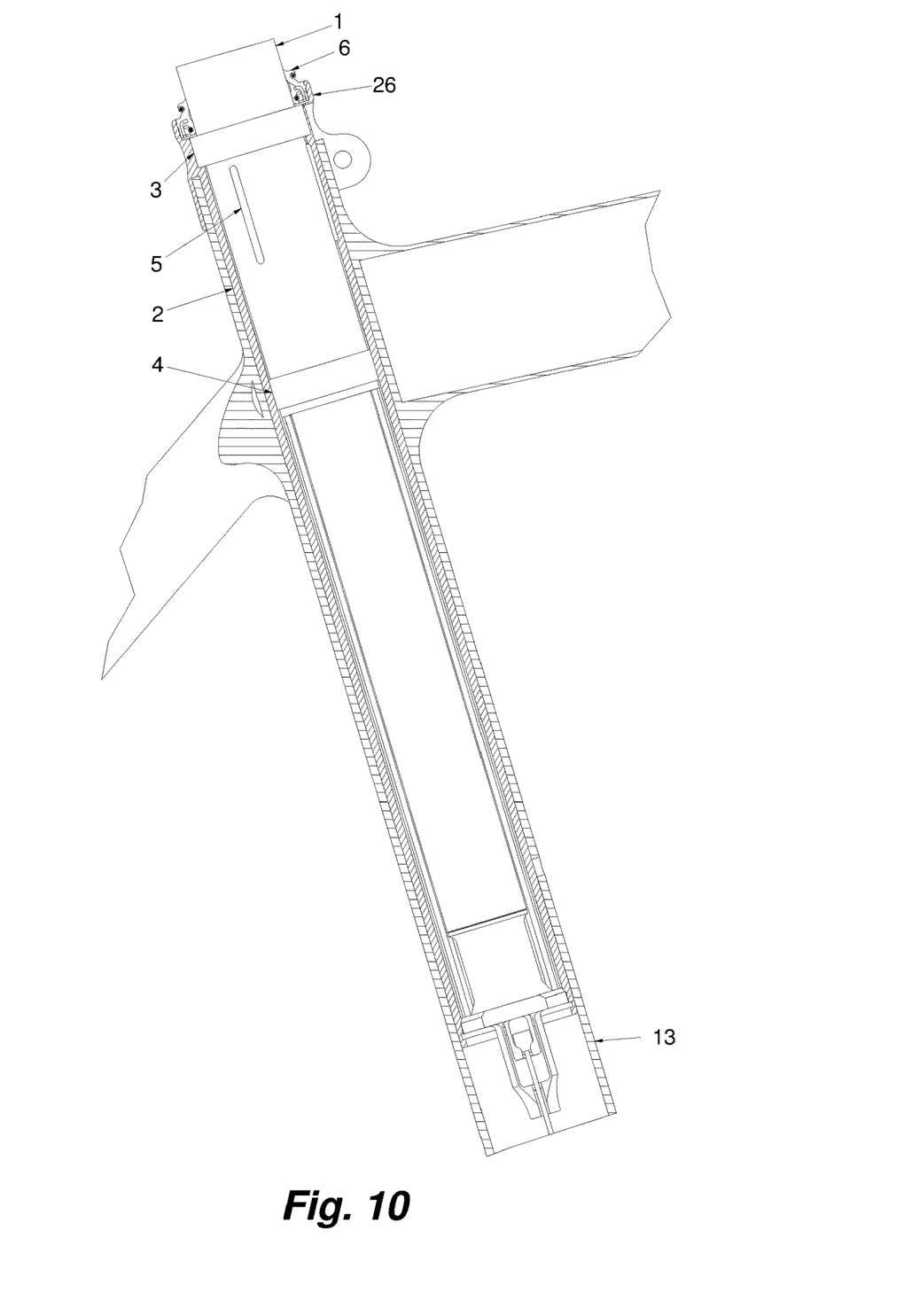
FIG. 10 is a cross-sectional detail illustrating an example of an integrated post clamp/dropper collar securing a lower tube in a frame in accordance with the present disclosure.

With reference, for example, to FIGS. 8, 9, 10, with the dropper post 100 fully inserted into the frame, more simplification and weight savings can be had by integrating the post clamp 10 (e.g., FIGS. 7A, 7B) into the post collar 22 of the dropper post, forming an integrated post clamp 26. This will allow the dropper post to clamp in the frame like normal, preventing it from rotating or pulling out. This may also reduce the stack height 19 (FIG. 2B). The traditional style post and post clamp 10 combination may use a thicker lower tube to provide enough compression to stop rotation. In contrast, an integrated post clamp 26 can distribute the twisting load better to the frame, requiring less compression on the lower tube 2, allowing for a thinner walled lower tube 2. An integrated post clamp 26 also provides a cleaner appearance.

One step further would be full frame integration where the splined lower tube 2 is the frame seat tube 13. In place of the post clamp 10 would then be the post collar 22 to support the upper bushing 3 and wiper seal 6. The lower end cap that holds the bottom of the locking mechanism can be attached to the bicycle frame by a multitude of methods.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein.

| Figure Callout | Part/Feature |
| --- | --- |
| A | Upper Tube (Stanchion Tube) |
| B | Lower Tube |
| C | Frame Seat Tube |
| D | Post Clamp |
| E | Saddle Clamp (Fixed Head Height) |
| F | Saddle |
| G | Post Collar |
| 100 | Dropper Post |
| 1 | Upper Tube (Stanchion Tube) |
| 2 | Lower Tube |
| 3 | Upper Bushing |
| 4 | Lower Bushing |
| 5 | Anti-Rotation Pins |
| 6 | Wiper Seal |
| 7 | Saddle |
| 8 | Cartridge |
| 9 | Saddle Clamp (Floating Height) |
| 10 | Post Clamp |
| 11 | Upper Retaining Ring |
| 12 | Lower Retaining Ring |
| 13 | Frame Seat Tube |
| 14 | Saddle Rails |
| 15 | Bushing Overlap |
| 17 | Maximum Insertion Depth (Post) |
| 18 | Maximum Insertion Depth (Frame) |
| 19 | Stack Height |
| 20 | Frame-to-Saddle Height |
| 21 | Collar-to-Saddle Height |
| 22 | Post Collar |
| 23 | Depth Limiting Frame Feature |
| 25 | Upper Tube Trim Line |
| 26 | Integrated Post Clamp/Collar |
| 27 | Grooves |
| 28 | Upper End Cap |
| 29 | Lower End Cap |
| 30 | Cylinder Cap |
| 31 | Piston Rod |
| 32 | Actuator |

The invention claimed is:

1. A height-adjustable seat post, comprising:
   a lower tube having a top open end and a bottom open end;
   an upper tube having a top end and a bottom end, wherein the top end of the upper tube is configured to be received through the bottom open end of the lower tube and extend beyond the top open end; and
   a saddle clamp removably coupled to the upper tube;
   wherein when the saddle clamp is removed from the upper tube, the top end of the upper tube is configured to pass through the bottom open end of the lower tube;
   further comprising a first bushing coupled to the lower tube proximate the top open end and a second bushing coupled to the upper tube.

2. The height-adjustable seat post of claim 1, further comprising a collar extending radially outward from the lower tube proximate the top open end.

3. The height-adjustable seat post of claim 2, wherein the collar and the lower tube are monolithic.

4. The height-adjustable seat post of claim 2, wherein the collar is coupled to the lower tube.

5. The height-adjustable seat post of claim 1, wherein the upper tube includes a clamping region, the clamping region being a portion of the upper tube at which the saddle clamp can be removably coupled.

6. The height-adjustable seat post of claim 1, wherein the first bushing remains coupled to the lower tube and the second bushing remains coupled to the upper tube when the upper tube is removed from the lower tube.

7. A height-adjustable seat post, comprising:
   a lower tube having a top open end and a bottom open end;
   an upper tube having a top end and a bottom end, wherein the top end of the upper tube is configured to be received through the bottom open end of the lower tube and extend beyond the top open end; and
   a saddle clamp removably coupled to the upper tube;
   wherein when the saddle clamp is removed from the upper tube, the top end of the upper tube is configured to pass through the bottom open end of the lower tube; and
   wherein a portion of the upper tube is configured to be removed to adjust a length of the upper tube.

8. The height-adjustable seat post of claim 7, further comprising a collar extending radially outward from the lower tube proximate the top open end.

9. The height-adjustable seat post of claim 8, wherein the collar and the lower tube are monolithic.

10. The height-adjustable seat post of claim 8, wherein the collar is coupled to the lower tube.

11. The height-adjustable seat post of claim 7, further comprising a first bushing coupled to the lower tube proximate the top open end and a second bushing coupled to the upper tube.

12. The height-adjustable seat post of claim 11, wherein the first bushing remains coupled to the lower tube and the second bushing remains coupled to the upper tube when the upper tube is removed from the lower tube.

13. The height-adjustable seat post of claim 7, wherein the upper tube includes a clamping region, the clamping region being a portion of the upper tube at which the saddle clamp can be removably coupled.

14. A height-adjustable seat post, comprising:
   a lower tube having a top open end and a bottom open end;
   an upper tube having a top end and a bottom end, wherein the top end of the upper tube is configured to be received through the bottom open end of the lower tube and extend beyond the top open end; and a saddle clamp removably coupled to the upper tube;

wherein when the saddle clamp is removed from the upper tube, the top end of the upper tube is configured to pass through the bottom open end of the lower tube;

wherein the saddle clamp is configured to be removably coupled to a clamping region of the upper tube; and wherein a portion of the upper tube is configured to be removed to adjust a length of the upper tube and to adjust a position of the clamping region relative to the bottom end of the upper tube.

15. A height-adjustable seat post assembly, comprising:

a lower tube having a first end and a second end;

an upper tube having a top end and a bottom end, a portion of the upper tube is received within the lower tube; and a saddle clamp configured to be removably coupled to a clamping region of the upper tube;

wherein a portion of the upper tube is configured to be removed to adjust a length of the upper tube and to adjust a position of the clamping region relative to the bottom end of the upper tube.

16. The height-adjustable seat post assembly of claim 15, further comprising a collar extending radially outward from the lower tube proximate the first end.

17. The height-adjustable seat post assembly of claim 16, wherein the collar and the lower tube are monolithic.

18. The height-adjustable seat post assembly of claim 16, wherein the collar is coupled to the lower tube.

19. The height-adjustable seat post assembly of claim 16, wherein the collar is configured to limit an insertion distance of the lower tube within a bicycle frame.

20. The height-adjustable seat post assembly of claim 19, wherein, when the collar engages the bicycle frame, a portion of the lower tube extending from the collar to the second end is fully received within the bicycle frame.

21. The height-adjustable seat post assembly of claim 20, wherein a sidewall thickness of the lower tube is less than a sidewall thickness of the upper tube.

22. The height-adjustable seat post assembly of claim 21, further comprising a post clamp configured to receive a portion of a seat tube of the bicycle frame and couple the lower tube to the seat tube.

23. The height-adjustable seat post assembly of claim 22, wherein the post clamp is formed from the collar.

24. The height-adjustable seat post assembly of claim 22, wherein the post clamp is removably coupled to the collar.

25. The height-adjustable seat post assembly of claim 15, further comprising a bicycle frame including a seat tube, wherein the lower tube is formed from the seat tube.

26. The height-adjustable seat post assembly of claim 25, wherein the lower tube is configured to restrain rotational movement of the upper tube about a longitudinal axis of the lower tube while allowing translational movement of the upper tube along the longitudinal axis of the lower tube.

27. The height-adjustable seat post assembly of claim 26, wherein the lower tube includes at least one of at least one groove and at least one pin and the upper tube includes at least one of the other of the at least one groove and the at least one pin, the at least one groove configured to receive the at least one pin.

28. The height-adjustable seat post assembly of claim 27, wherein the lower tube includes the at least one groove and the upper tube includes the at least one pin.

29. The height-adjustable seat post assembly of claim 27, wherein the lower tube includes the at least one pin and the upper tube includes the at least one groove.

30. The height-adjustable seat post assembly of claim 25, further comprising a collar formed from the first end of the lower tube.

31. The height-adjustable seat post assembly of claim 25, further comprising a collar removably coupled to the first end of the lower tube.

* * * * *